United States Patent [19]

Belz

[11] Patent Number: 4,551,369

[45] Date of Patent: Nov. 5, 1985

[54] COMPOSITE PACKAGING MATERIAL AND PROCESS FOR MAKING SAME

[76] Inventor: Roland K. Belz, Sonnenhalde 31, D-7022 Leinfelden-Echterdingen-1, Fed. Rep. of Germany

[21] Appl. No.: 645,508

[22] Filed: Aug. 30, 1984

Related U.S. Application Data

[63] Continuation of Ser. No. 221,288, Dec. 30, 1980, Pat. No. 4,469,728.

[30] Foreign Application Priority Data

Jan. 9, 1980 [DE] Fed. Rep. of Germany ....... 3000516

[51] Int. Cl.⁴ ............................................. A47K 13/14
[52] U.S. Cl. ................................. 428/36; 156/244.11; 156/244.18; 156/250; 156/279; 428/68; 428/90; 428/337
[58] Field of Search ..................... 418/36, 68, 90, 337; 156/244.11, 244.18, 250, 279

[56] References Cited

U.S. PATENT DOCUMENTS 3,625,794 12/1971 Arikawa et al. .................. 156/244
3,788,934 1/1974 Coppa ................................. 161/17
3,859,125 1/1975 Miller et al. ................. 117/155 UA

FOREIGN PATENT DOCUMENTS 844509 8/1960 United Kingdom .
861423 2/1961 United Kingdom .
937852 9/1963 United Kingdom .
960203 6/1964 United Kingdom .
960204 6/1964 United Kingdom .

*Primary Examiner*—James J. Bell
*Attorney, Agent, or Firm*—Steele, Gould & Fried

[57] ABSTRACT

The invention relates to a composite foil, particularly a toilet seat support in which at least one thin, outer normally water-insoluble sealing layer (3) is connected to a less thin water-soluble supporting layer (2) optionally by means of one or more intermediate layers. For obtaining a complete tightness at least the sealing layer (3) is constructed in non-porous manner by extruding a foil from a thermoplastic material. Furthermore, the invention relates to a process and apparatus for the production of the foil by extrusion, preferably with a co-extrusion die.

32 Claims, 5 Drawing Figures

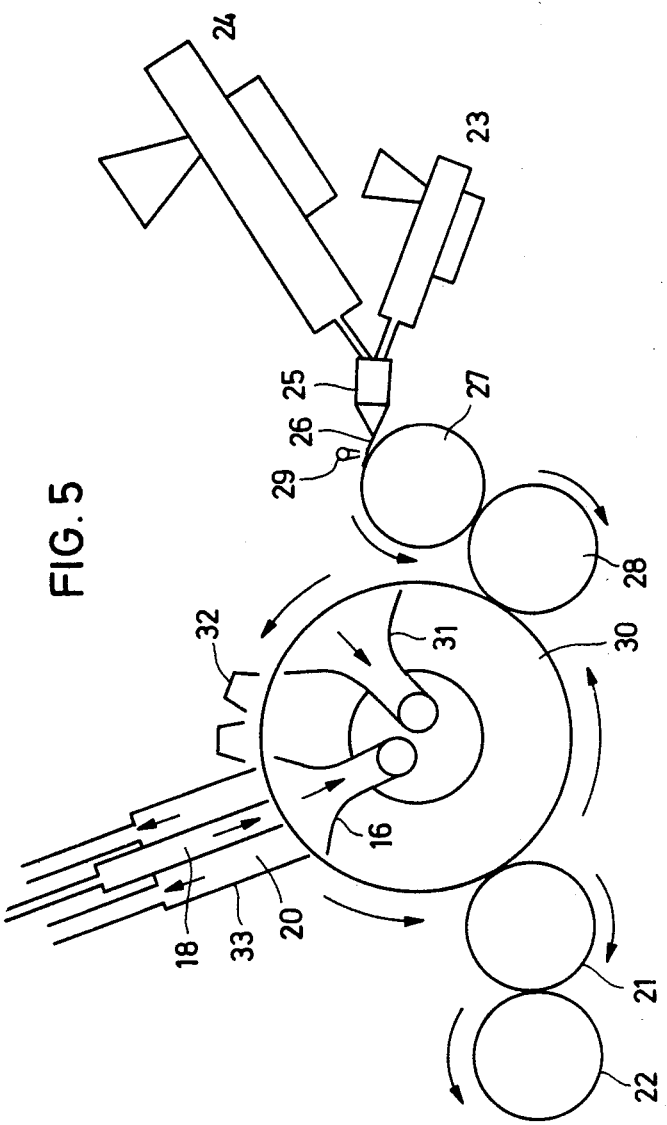

COMPOSITE PACKAGING MATERIAL AND PROCESS FOR MAKING SAME

This is a continuation of application Ser. No. 221,288, filed Dec. 30, 1980, now U.S. Pat. No. 4,469,728.

BACKGROUND OF THE INVENTION

The invention relates to a composite foil, particularly a toilet seat support made from at least two layers in which at least one thin, outer, normally water-insoluble sealing layer is connected to a less thin, water-soluble supporting layer by means of one or more intermediate layers, as well as to a process and to an apparatus for producing this composite foil.

A toilet seat support formed from such a composite foil is known from DOS 2,703,005 of the present Applicant. In the manufacture of this toilet seat support, the individual layers of the composite foil are made by applying solutions of the foil materials to suitable substrates and evaporating the solvent. However, this process is relatively complicated and costly, because suitable evaporating equipment is required and also special precautions must be taken when handling organic solvents. It has also been found that the sealing layer does not have the desired freedom from pores due to the fact that bubbles form on evaporating the solvent from the sealing layer film, which leads to pores on drying.

BRIEF SUMMARY OF THE INVENTION

The object of the invention is to provide a composite foil of the aforementioned type, more pore-free than known foils and which can be manufactured more simply and cheaply.

According to the invention, this object is achieved in that at least the sealing layer of the foil is constructed in non-porous manner by extruding a thermoplastic material which is only soluble in water with the aid of a solubilizer. Preferably, the other layers of the foil are also produced by extrusion.

Due to the fact that some or all of the layers of the composite foil are formed by extrusion, complete tightness is ensured from the side of the sealing layer, because the individual foils permit non-porous extrusion. With the aid of an extruder, it is also much easier to vary the layer thickness of the individual foils when producing the individual layers from solution. This permits easy adaptation of the structure of the composite foil and the reciprocal ratio of the thicknesses of the individual layers to the intended use. In the solution process according to DOS 2,703,005 care must be exercised when selecting the material for the individual layers because different solubilities were present in the solvents used for producing the layers so as to avoid dissolving an already formed layer when applying the next layer. This problem does not exist with the "dry process" according to the invention. Instead, the materials for the individual layers can be selected in accordance with the properties which they are to have in the finished product.

In particular, therefore, when the composite foil is to be used as a toilet seat support the side of the foil remote from the sealing layer has a textile coating of individual fibres which are anchored or stuck to the top of the foil. The length of the fibres, which to a certain extent are matted together can be in the range of approximately 0.01 to 2 mm or more. The fibres mechanically reinforce the foil and prevent its shrinkage and sticking. However, after use the foil can be completely dissolved, because although to a certain extent the fibres are matted together, they are not permanently interconnected. Cellulose and in particular cotton fibres are preferably used. However, other fibrous materials are also suitable.

The sealing layer and the following and optional further layers are preferably joined together flat, particularly by bonding or welding. However, they can also be adhered by dissolving one surface and/or the other or with the aid of an adhesive. The sealing layer and the supporting layer are preferably made from the same plastics material, which is normally insoluble in water, while the supporting layer additionally contains solubilizing additives for it and the sealing layer. These additives can be uniformly distributed in the supporting layer or can be present in a higher concentration in the boundary area with the sealing layer. This is generally dependent on the thickness of the sealing layer and on how easily the insolubility in water can be converted to solubility with the aid of a solubilizer. If the supporting layer is made from a water-soluble material, such as hydroxy propyl cellulose it can also be free from solubilizing additives in which case an additional intermediate layer positioned between the sealing layer and the supporting layer can be provided which contains the solubilizing additives.

As the sealing layer does not have to be self-supporting, it can generally be very thin and it has been found that a thickness of 1 to 5 $\mu$m, particularly 2 to 3 $\mu$m is completely adequate to provide the desired tightness. Therefore, the sealing layer thickness is generally below 10 $\mu$m. The supporting layer thickness is dependent on how many other layers the composite foil contains and which mechanical stresses and loads it must withstand. Particularly in those cases when there are no plastics layers other than the sealing layer, but the supporting layer is provided with a textile covering, its thickness is generally between approximately 5 and 50 $\mu$m, particularly 10 to 12 $\mu$m.

Suitable materials for the sealing layer are those plastics which are not soluble in water and the conventionally used neutral aqueous solutions, but which can be made soluble by suitable solubilizers, particularly acids or bases. However, the supporting foil can be made from a water-soluble or a retarded soluble plastics material such as plasticized polyvinyl alcohol or hydroxy propyl cellulose ("Klucel J" of Hercules Powder). However, it is advantageously possible to use for the sealing layer and also the supporting layer the same water-insoluble plastic or the same plastics mixture, while making the plastics material used for the supporting layer soluble by incorporating the solubilizer. However, at least those plastics used for the sealing layer must be extrudable.

Preferred materials for the sealing layer are polymers, particularly copolymers of unsaturated, organic acids such as acrylic acid, methacrylic acid and particularly maleic acid anhydride. Due to their flexible properties, particular reference is made to copolymers of maleic anhydride and ethyl vinyl ethers, particularly those produced in a ratio of 1:1. Reference is also made to copolymers of maleic anhydride and methacrylate, terpolymers of maleic anhydride, methacrylate and butyl acrylate, as well as copolymers of methacrylic and acrylic acid, especially copolymers of acrylic acid and methacrylate. Reference is always given to those polymers which are solvent-free, particularly block polymers.

Thus, according to one of the embodiments of the invention preferably at least the sealing layer is made by using a thermoplastic, water-insoluble, but in a basic medium soluble homopolymeric or copolymeric acid, particularly such an acid which itself is produced by using an acrylic acid, methacrylic acid, crotonic acid and/or maleic acid and their anhydrides respectively. The sealing layer can also be made from a copolymeric or terpolymeric acid being soluble in a basic medium, whereby as comonomers and termonomers resp. vinyl ether, acrylate and/or methacrylate are preferred. Also copolymers or terpolymers from maleic acid anhydride are suitable, whereby vinyl ether, acrylate and/or methacrylate, are preferably used as comonomers and termonomers resp. On the other hand a thermoplastic water-soluble cellulose derivative can be used for the supporting layer. Preferred cellulose derivatives are hydroxy ethyl cellulose and hydroxy propyl cellulose.

Solid copolymers of vinyl acetate and a small amount of crotonic acid present as low viscosity polymers and which are alkali-soluble also constitute suitable extrudable plastics. Such a polymer, is for example, marketed under the trade name Vinnapas c 305 by Wacker-Chemie GmbH, Munich. Another suitable product is an ester of phthalic acid and pentaerythritol in the form of an ethanol-soluble and alkali-soluble hard resin, as marketed by BASF under the trade name Phthalopal PP as hard resin for the production of wood and paper lacquers. The plastics can be mixed with one another and with soft resins, conventional plasticizers, fillers and other additives. It has been found that particularly in the case of the sealing layer, it is advantageous if it contains rubber-elastic additives, which are advantageous in the case of toilet seat covers for the purpose of providing non-slip properties. The rubber-elastic or rubbery elastomeric additives need not be soluble by the solubilizer. As such additives increase the elasticity of the foil and can prevent the sticking together, they are advantageously also contained in the supporting layer. A proportion of block copolymer with a polystyrene-polybutadiene-polystyrene structure has proved particularly advantageous as an elastomer additive. In addition, the individual layers of the composite foil can be formed from plastics mixtures.

Suitable solubilizers for dissolving the sealing layer are in particular water-soluble carbonate, secondary and tertiary phosphates, particularly triammonium phosphate, silicates, borates and amines, particularly triethanol amine. The concomitant use of so-called disintegrating agents which swell greatly or evolve gases on contact with water may also be advantageous. An example of such a disintegrating agent is sodium carboxymethyl cellulose (Nymcel ZSB 10 of Nyma). Preferably, all the materials for the composite foil are not harmful to the environment, as is largely the case with the above products.

The invention also relates to a process for the continuous production of a composite foil comprising at least two interconnected layers, particularly a foil which is substantially waterproof from one side and water-soluble from the other side. This process is characterized in that the individual and preferably all the layers of the foil are formed from thermoplastic materials with the corresponding characteristics by extrusion and are joined together. The individual layers can be extruded as separate foils and then interconnected. Connection preferably takes place when the foils are still hot and tacky by placing one upon the other. However, as stated hereinbefore, the surfaces can also be subsequently made tacky. The foils coming from the extruder and optionally being stretched can be directly further processed or can be rolled up for intermediate storage, either individually, but preferably as a composite foil.

According to an embodiment of the invention, the two layers are extruded by a co-extrusion nozzle and are joined to form a particularly intimate connection. However, in the case of this embodiment, it must be ensured that the constituents of the two layers are so matched to one another that any waste material produced can be used in either extruder without detrimentally influencing the material composition of the layers. Thus, waste material containing the solubilizer is reused for producing a solubilizer-containing supporting layer or intermediate layer.

Generally, the individual foils are discharged from the extruder with a thickness exceeding that required in the composite foil. In this case, the foils are stretched to the desired thickness, either individually or in combined form.

According to one embodiment of the invention, the process is used for producing composite foils with cutouts and/or edges not forming straight lines. In this embodiment, the edges and/or cutouts are continuously thermally cut, particularly by cutting welding. Cutting can be carried out in a combination of at least two layers. However, if the layers of the composite foil are produced in the form of individual foils which are interconnected, said individual foils are preferably successively cut by tools accompanying the movement of the cut foils and which cut in accurate-to-fit manner the following foils which are to be placed on the already cut foils. This ensures size matching in a simple manner. If, as is the case with an endless belt of toilet seat supports, the composite foil is to have periodically or cyclically recurring edge shapes and/or cutouts, a continuously circulating conveying mechanism is preferably used for forming said endless bands and carries the cutting mechanisms arranged in the manner of an integral multiple of the cycle of the recurrent edge shapes. By cutting the individual foils locally at spaced locations it is possible to separately collect the waste material formed by the cutting of the individual foils and to return it again for reuse to the appropriate extruder. For a similar reason, it is preferable to coat the composite foil surface with textile fibres only when, if appropriate, the composite foil has been cut, which prevents the undesired mixing of foil waste with fibres.

The invention also relates to an apparatus for performing the process according to the invention and for producing the composite foil. The apparatus is characterized in that it has at least two extruders with associated ring or slot dies or nozzles and at least one device for the continuous drawing off and moving together of the foils formed. Preferably, at least one cutting mechanism movable with the foils for cutting edges and/or cutouts is provided. At least one of the mechanisms is positioned on the endless conveying mechanism or is formed by the latter. The extruders and nozzles are preferably combined into coextrusion means.

If the composite foil is to be produced in the form of webs or blanks with periodically recurring edge shapes and/or cutouts, the conveying mechanism surface preferably has the form of the composite foil to be produced, the surface edges being shaped by cutting mechanisms. The cutting mechanisms are preferably constituted by cutting welding wires or strips bounding the edges of the surface of the conveying mechanism and slightly projecting beyond such surfaces to bring about the cut. The conveying mechanism is advantageously in the form of a roller, particularly a roller with a bore. Suction mechanisms for collecting and returning the cut-off foil residues can be located below the conveying mechanism surface, particularly below the roller surface in the vicinity of the points at which the foils are cut. A flocking device is advantageously provided at one point in the direction of movement of the conveying mechanism which is behind the cutting points. As a result, the textile covering is only provided on those surface portions of the composite foil remaining on the desired endless belt.

The roller diameter can be between approximately 2500 and 3000 mm, giving a circumference of more than 9 m. Thus, a circumferential length can cover a plurality of cycle lengths, e.g. of toilet seat supports, leading to a high drawing-off speed, linked with an adequate foil cooling. However, if desired, the roller diameter can be much smaller, e.g. 1 m or less, particularly if foil cooling rollers and optionally stretching rollers are to be provided between the extruder and the roller. The series-connection of cooling and stretching rollers is particularly advantageous if the individual composite foil layers are joined together in a co-extrusion nozzle.

There are numerous possible uses for the foil according to the invention, particularly in the packaging field. The elimination of packaging materials which are not reusable constitutes a serious problem. This can be eliminated by the foil according to the invention which, after use, can be dissolved in water or aqueous solutions and its material properties can be such that the substances passing into solution are harmless specifically not harmful to the environment.

The maleic acid anhydride copolymers result after the hydrolysis in similar products as polymers on the basis of acrylic acid being used to a great extent as a coagulating agent in the sewage sludge processing. Therefore, they are just as minimally harmful in sewage as the acrylic acid copolymers.

According to the statement of the producer the cellulose derivative Klucel is to be estimated in toxicological respect just as refined cellulose.

The carbonates, phosphates, silicates, borates and triethanolamine being used as solubilizer are components of detergents, as well as the disintegrating agent Klucel, which also can be used as a coagulation aid.

As the composite foil according to the invention is made from thermoplastic materials, packaging made from the foil can be tightly sealed by welding or sealing. Sealable or sealed bags made from the composite foil according to the invention are particularly advantageous when in the form of so-called function packs and further reference will be made thereto hereinafter. All the packages have the feature of dissolving in an aqueous medium when thrown away after use or rapidly rot when moisture gets to them, e.g. in the open air.

According to a preferred embodiment of the invention, the foil is in the form of a bag, sack, carrier bag or the like, the walls being constructed in such a way that it has a sealing layer both on its inside and outside. This can be achieved in that for forming a bag wall in each case two composite foils are superimposed in such a way that their water-soluble sides face one another and the sealing layers point to the outside. Thus, the bags and the like are insensitive to moisture. However, if after use the bags are mechanically torn, water can penetrate between the water-soluble layers permitting the dissolving of the foils and consequently the bags. It is also possible to construct the composite foil in such a way that a water-soluble supporting layer is provided on both sides with a sealing layer. Following mechanical damage, this foil can also be completely dissolved, because water penetrates between the sealing layers into the foil, so that both the supporting layer and then the sealing layers can dissolve. In this embodiment, it is also possible to make the inside of the supporting layer porous or provide it with an absorptive insert, so that water penetration to the supporting layer is aided and the dissolving process accelerated.

As stated hereinbefore, the thickness and composition of the supporting layer is substantially dependent on the desired properties, particularly the mechanical strength of the composite foil. The thickness of the supporting layer or layers can be up to 0.5 mm or even 1 mm, no limits being placed on the thickness. In addition, reinforcements can be provided in or between the layers, it preferably being ensured that the reinforcements readily decompose during the dissolving process, as is the case e.g. with individual fibres. If on the soluble side and/or the sealing layer, the composite foil has a textile covering, it is also advantageously usable as disposable bed linen, which can easily be disposed of. It is also possible, e.g. for tubular packings to produce the composite foil according to the invention in the form of a tubular material or blown sheet, it merely being necessary to provide corresponding annular extruder nozzles.

The physical and chemical properties of the individual layers of the composite foil can be varied in that plastic formulations are used for these layers whose composition is correspondingly varied. The dissolving speed of the single layers can be defined by the ratio of the portion of the acid in the copolymers resp. terpolymers to the portion of comonomers resp. termonomers as well as additionally by nature and content of the solubilizer in the supporting layer. Furthermore, the dissolving rate for the composite foil can be reduced by incorporating less readily soluble or scarcely soluble substances in disperse phase or dissolved form into the materials of the individual layers. If desired, tackiness-increasing additives can be incorporated into one or more layers. Thus, it has proved advantageous to incorporate a non-drying contact adhesive (Lutonal M40) to produce the desired adhesiveness for flocking with textile fibres. For coating with textile fibres, it is naturally possible to use additional adhesives, such as e.g. polyvinyl pyrrolidone applied to the surface layer to be coated with fibres.

BRIEF DESCRIPTION OF THE DRAWINGS

The invention is described in greater detail hereinafter relative to non-limitative embodiments and the attached drawings, wherein:

FIG. 5 is a diagrammatic view of another embodiment of the apparatus according to the invention for producing the composite foil.

DETAILED DESCRIPTION OF THE PREFERRED EMBODIMENTS

Figure 1:
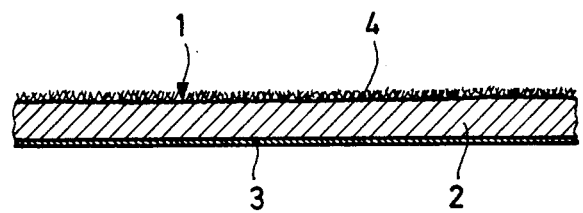
FIG. 1 is a cross-section through a composite foil according to the invention.

The composite foil 1 shown in FIG. 1 comprises three layers. A supporting layer 2 with a thickness of approximately 10 to 12 μm is made from a copolymer from maleic acid anhydride and ethyl vinyl ether being soluble in basic medium. The supporting layer can also contain plasticizers, soft resins and/or other additives. Due to its content of basic solubilizer, such as bisodium phosphate, the supporting layer is water-soluble, because under the action of water, the medium becomes basic due to the dissolving of solubilizer and is consequently able to dissolve the supporting layer. The bottom of the supporting layer is provided with an approximately 2 to 3 μm thick, completely non-porous sealing layer 3 made from the same material as the supporting layer. However, in this case it does not contain incorporated solubilizer, so that the sealing layer is insoluble in neutral aqueous solution. The two layers are welded or stuck together over their entire surface areas. On the side remote from the sealing layer 3, the supporting layer 2 has a textile fibre covering 4. The fibres are anchored in the supporting layer 2 and over most of their length rest freely on the surface. The fibres are cellulose fibres with a length of approximately 0.1 to 1 mm. The textile fibre covering has a number of functions. Thus, it prevents shrinkage of the relatively thin composite foil during handling and the surfaces continue to adhere to one another, as is often the case with thin foils. The covering also has thermally insulating properties and is also able to absorb a certain amount of moisture, without any surface dissolving the composite foil. The composite foil is completely water-soluble, but dissolving can only take place if water acts on the side of the composite foil provided with the textile covering. As stated hereinbefore, at this point, the copolymer is water-soluble due to the incorporated solubilizer. Since basic medium is formed on dissolving supporting layer 2 and the solubilizer, the thin sealing layer is also dissolved by this medium. However, if water only comes onto the surface of sealing layer 3, the water is unable to attack the latter, so that the complete composite foil remains unaffected.

The composite foil is particularly suitable for producing toilet seat supports, but can be used with particular advantage wherever protection is required against moisture and wetness, particularly in the case of packagings and also when it is desired to dispose of the used material in a manner which is not prejudicial to the environment. The foil can be shaped into a function bag with particular advantage. If such a bag has the sealing layer on the outside, it can be used for storing materials which are dry or are unable to dissolve the water-soluble supporting layer. On opening the bag and bringing it into contact with water, it dissolves and frees its content. If the sealing layer is on the inside, then the bag can be used for storing aqueous, non-alkaline substances, e.g. bath additives and the like. If the still closed or sealed bag with its water-soluble exterior is placed in water, it dissolves and frees its content.

Figure 2:
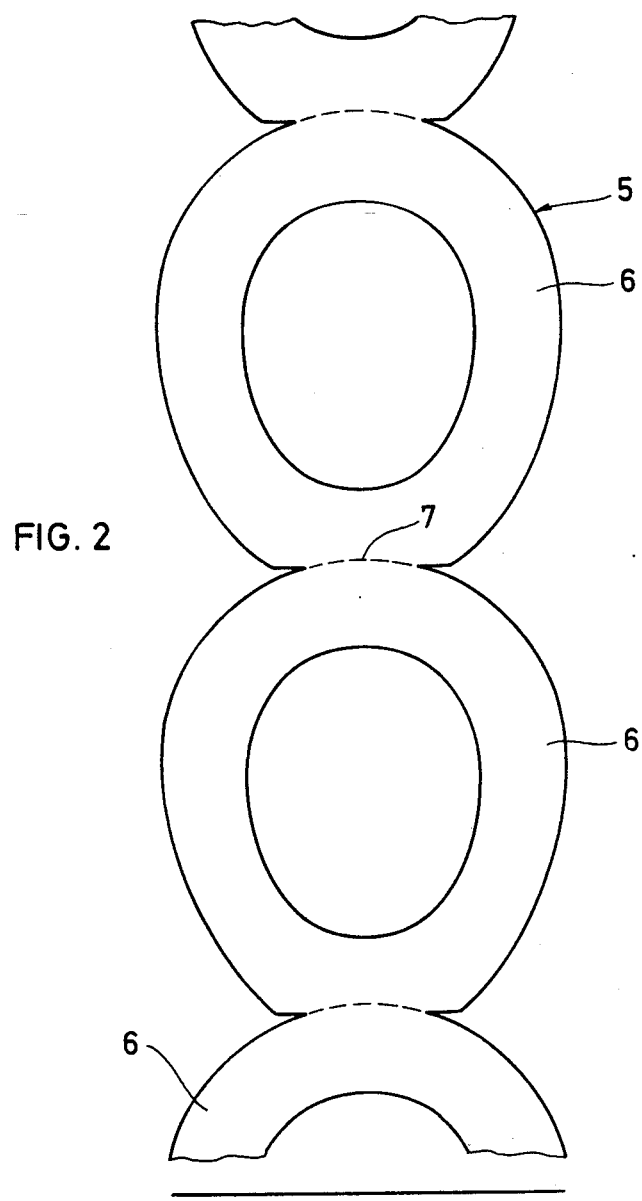
FIG. 2 is a cutout from an endless belt of the composite foil of FIG. 1 in the form of series-arranged toilet seat supports.

The endless band shown in FIG. 2 comprises a plurality of series-arranged toilet seat supports 6, joined together along common perforated lines 7. The toilet seat supports 6 have the same shape as the conventional toilet seat. Numerous variants are possible in the manner known in connection with such supports.

Figure 3:
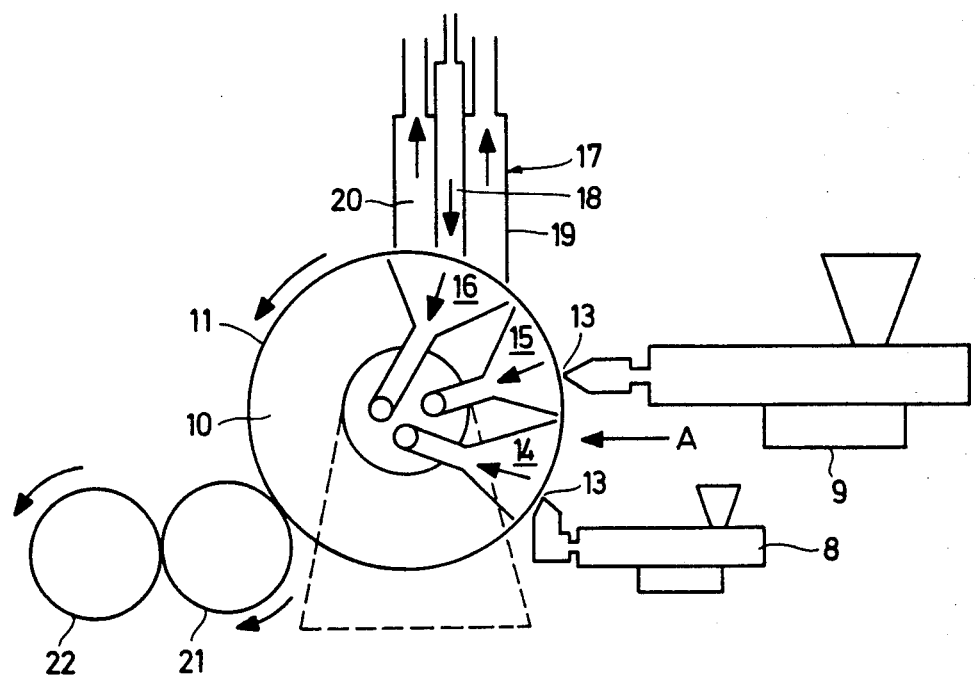
FIG. 3 is a diagrammatic view of an apparatus for producing the endless band of FIG. 2.
Figure 4:
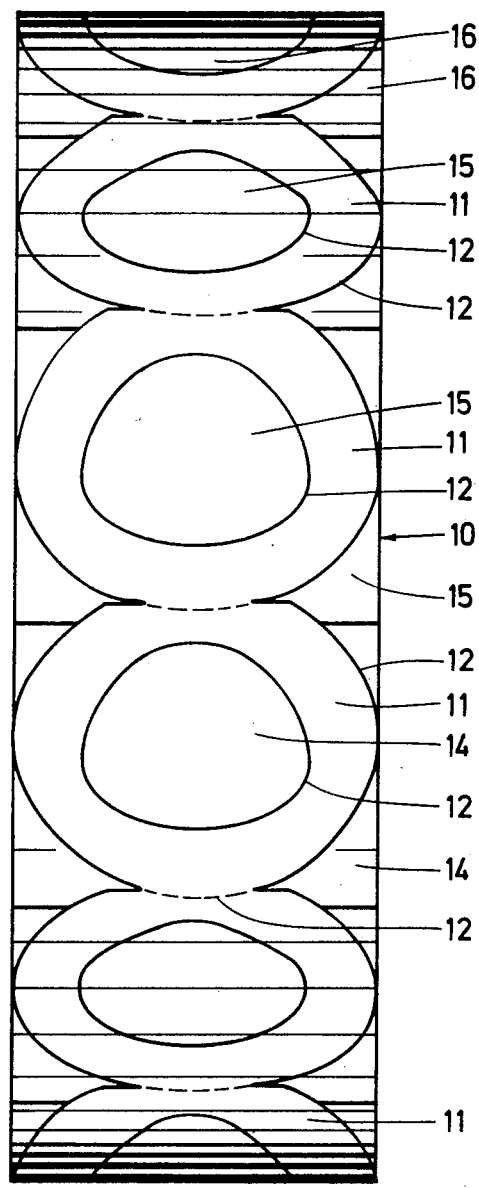
FIG. 4 is a side view of the roller of FIG. 3 in the direction of arrow A.

The apparatus for producing the endless band 5 for toilet seat covers 6 shown in FIGS. 3 and 4 essentially comprises two extruders 8 and 9 and a rotary roller 10 provided with a drive (not shown), whose outer periphery corresponds to an integral multiple of the length of the toilet seat supports and whose maximum width corresponds to the maximum width of a toilet seat support or a multiple thereof. In FIG. 3, the roller can be driven counterclockwise. The surface 11 of roller 10 constitutes an aerial impression of the winding off of the endless band of the series-arranged toilet seat supports 6. It has the shape of the endless band 5, the points corresponding to the flat parts of the endless band also being flat and the cutout points or the cut edge locations of the endless band also being formed as recesses in the surface 11 of roller 10. Depending on the desired characteristics, the surface 11 can be made from a plastics material or a metal. The edges of the roller surface 11 are covered in the form of edge lines and recess edges of endless belt 5 with cutting welding strips 12 connected to suitable power supplies for heating purposes. As a result of the cutting welding strips, the endless band 5 of toilet seat support 6 can be cut from one or more foil webs.

The two extruders 8 and 9 are staggered along the roller periphery and are set up for extruding thin foils of thermoplastic material. The width and thickness of the slot die 13 of each extruder are fixed in such a way that the width of the foils, optionally following a stretching process, is slightly greater than the width of the roller surface for the endless band and a foil with the desired material thickness is formed. The first extruder in the roller movement direction is used for producing an approximately 2 to 3 μm thick foil for forming the composite material sealing layer which is unsoluble in substantially neutral aqueous solutions but soluble in basic solutions. Guide and stretching pulleys, not shown in the drawing, can be provided between the slot die 13 of extruder 8 and roller 10 for supporting and dimensioning the foil, which is not in itself self supporting. When placed on roller 10, the foil is cut by the cutting welding strips 12. A thicker foil formed in the same way by the second extruder 9 is now placed or coated onto the corresponding blank. The thickness of the latter foil is approximately 10 to 12 μm and serves to form the supporting layer of the composite foil. It contains the solubilizer, which is extruded together with the copolymer. Instead of the copolymer a cellulose derivative, such as hydroxy propyl cellulose, can be used. On coming into contact with roller 10, the second foil is cut by means of the cutting welding strips 12 in the same way as the first foil. The two foils are really jointed together by welding either when the two foils are still hot and soft or by bringing about surface tackiness with the aid of a suitable heat source.

Stationary suction funnels 14, 15 and 16 are provided within the roller, the first suction funnel 14 being in the vicinity of the application point of the first foil and the second suction funnel 15 in the vicinity of the application point of the second foil. These funnels are used for the separate removal of waste material from the two foils, so that said waste material can be reused without contaminating the particular extruders.

A flocking device 17 is associated with the third suction funnel 16 located directly following the second suction funnel on the outside of the roller. Said device has a box 19 directed onto the roller surface and said box contains a centrally disposed nozzle 18 for supplying a fibre air mixture to the free surface of the supporting foil. The fibres are preferably blown onto this layer while the surface is still tacky. However, it is also possible to make the surface tacky by suitable heating or it can be coated with a solvent or an adhesive. The outer annulus 20 of box 19, in the same way as funnel 16, is used for the sucking up of excessive fibres, but can also be provided for the suction of additional cooling air. Two further rollers 21 and 22 are provided for removing the now finished composite foil from the roller. Rollers 21 and 22 can also be constructed as cooling rollers and, if desired, can also compress or stretch the composite foil. The endless band 5 of toilet seat support 6 can then be folded in a packing machine and packed in boxes for delivery.

The invention is not limited to the presently described embodiment. In fact, numerous variants are possible without leaving the scope of the invention. Thus, a composite foil can be produced which, for use as a packaging material, has much thicker layers. It is also possible to produce the composite foil from a large number of layers in which there is no full-area connection between the layers. Instead, they can have bulges with air cushioned inserts, as is the case with deep-drawn cushion materials.

In the embodiment shown in FIG. 5, the apparatus for the production of the composite foil has a co-extrusion mechanism with two extruders 23 and 24, whose discharge points are combined into a single co-extrusion nozzle 25. Extruder 23 is used for supplying the material for the sealing layer and extruder 24 for supplying the material for the water-soluble supporting layer. Two cooling rollers 27 and 28 are used for taking up and drawing-off the composite foil formed by the two layers leaving extrusion nozzle 25 and said rollers simultaneously stretch the foil 26 by the desired amount. An air knife 29 positioned above the application point of foil 26 to the first cooling roller 27 is used for additional cooling and pressing of the foil onto said cooling roller. On leaving cooling roller 28, the composite foil is in its finished state and can be delivered to further processing devices.

For producing endless bands of toilet seat supports, this embodiment once again has a roller 30 provided with cutting welding devices and having a diameter of approximately 50 cm. Its surface represents one unwinding of the endless band of toilet seat supports, three of the latter being shaped on the roller surface and defined by cutting welding strips. For sucking off the cut foil waste, a suction funnel 31 is provided, because on striking the roller, the foil is already in the form of a composite foil. The waste is returned to extruder 24 for producing the supporting layer. A heating device 32 in the form of an infrared heater is provided on the roller surface just in front of a flocking device 33 in order to make the composite foil surface, which is already cooled tacky by heating, so that the fibre flock applied to the foil surface by the flocking device 33 firmly adhere. Otherwise, the construction is the same as in FIG. 3.

EXAMPLES

In the following some examples are given for the production of copolymers and termonomers for the sealing layer, whereby these polymers, when they are mixed with basic materials, can also be used as material for the supporting layer. Maleic acid anhydride is preferred as monomer causing the solubility in bases, whereby it is used in a molecular ratio of about 1:1 with the comonomer. With termonomers amounts are used of the other two comonomers in such a way that the sum of these comonomers results again in a molecular ratio of 1:1 with maleic acid anhydride. Methacrylate or ethyl acrylate as well as ethyl vinyl ether are preferably used as comonomers for copolymers and additionally butyl acrylate for termonomers.

The polymerization takes place under normal conditions by using free radical forming agents, for example peroxides, as catalysts at temperatures between room-temperature and 150° C., preferably between room-temperature and 100° C. As polymerization processes there are preferred the solvent-free polymerization and the emulsifying polymerization respect. Some characteristic features of the so obtained copolymers and terpolymers are shown in the following table. For forming the supporting layer the polymers can be mixed with up to 15 percent by weight of basic substance, whereby those are preferred, which have a softening effect, as for instance some amines.

Production and characterization of maleic acid anhydrite copolymers
(Abbreviations on a separate sheet)

| | comonomers | | catalyst | | solvent | molecular ratio | | | polymerization | | solubility in[b] | | | | | | flow-range | films |
|---|---|---|---|---|---|---|---|---|---|---|---|---|---|---|---|---|---|---|
| | | | | | | | | | tempera- | time | | NaOH | | | PHOS | | | |
| No. | I | II | | %[a] | solvent | MSA | I | II | ture °C. | h | WAS | 1 | 3 | 10 | 1 | 3 | 10 | °C.[c] | films |
| 38 | EVE | | LAP | 0.1 | BEN | 1 | 1 | | 70 | 6 | 1 | | 4 | | | 4 | | 240E | flexible |
| 39 | EVE | | LAP | 0.1 | SUB | 1 | 1 | | 70 | 6 | 1 | | 3 | | | 4 | | 240E | flexible |
| 49 | MAC | | | | ACE | 1 | 1 | | 80 | 7 | 1 | | 4 | | | 4 | | 220E | flexible, a little sticky |
| 51 | MAC | | | | BEN | 1 | 1.2 | | 80 | 6 | 1 | | 3 | | | 4 | | | flexible, a little sticky |
| 68 | MAC | BAC | CHC | 0.1 | SUB | 1 | 0.6 | 0.4 | 60 | 7 | 1-2 | 4 | 4 | 4 | 4 | 4 | 4 | 220-230 | flexible |

-continued

Production and characterization of maleic acid anhydrite copolymers
(Abbreviations on a separate sheet)

| | comonomers | | catalyst | | | molecular ratio | | | polymerization | | | solubility in[b] | | | | | | flow-range | |
| | | | | | | | | | tempera- | time | | NaOH | | | PHOS | | | | |
| No. | I | II | %[a] | solvent | MSA | I | II | ture °C. | h | WAS | 1 | 3 | 10 | 1 | 3 | 10 | °C.[c] | films |
|---|---|---|---|---|---|---|---|---|---|---|---|---|---|---|---|---|---|---|
| 69 | MAC | BAC | CHC | 0.1 | SUB | 1 | 0.5 | 0.5 | 60 | 7 | 1–2 | 2 | 3 | 3 | 2 | 3 | 3 | | flexible |

[a]based on monomere-mixture
[b]1/3/10: 1 resp. 3 resp. 10 percent solutions
24 h-evalution: 1 = unsoluble; 2 = swells; 3 = slowly soluble; 4 = quickly soluble
[c]measured on the Koflerbank; E = only softening
Abbreviations
MSA = maleic acid anhydride
WAS = water
PHOS = triamonium phosphate
EVE = ethyl vinyl ether
MAC = methyl acrylate
BAC = n-butyl acrylate
SUB = substance (solvent-free)
ACE = acetone
BEN = naptha
LAP = lauryl peroxide
CHC = bis(4-tertiary butyl-cyclo-hexyl)peroxide carbonate
(Perkadox 16)

What is claimed is:

1. In a packaging material having at least one outer, normally water-insoluble sealing layer and at least one soluble layer connected to said water insoluble layer, said soluble layer containing a solubilizer for said water-insoluble sealing layer, the improvement wherein:
   said water-insoluble sealing layer comprises an extruded non-porous layer of a thermoplastic material which is soluble in a non-neutral medium;
   said soluble layer comprises an extruded layer of a thermoplastic material; and,
   said solubilizer is present in an amount sufficient for solubilizing said water insoluble layer and said water soluble layer when the latter is also formed by extrusion of a water insoluble thermoplastic material.

2. A packaging material as claimed in claim 1, wherein said soluble layer is water soluble.

3. A packaging material as claimed in claim 1, wherein said soluble layer is water-insoluble and soluble in a non-neutral medium.

4. A packaging material as claimed in claim 1, further comprising a textile covering of individual fibers carried on said packaging material on the side remote from the sealing layer.

5. A packaging material as claimed in claim 1, wherein said sealing layer and said soluble layer are connected to one another over their entire surface area.

6. A packaging material as claimed in claim 5, wherein said sealing layer and said soluble layer are welded to one another.

7. A packaging material as claimed in claim 1, wherein the soluble layer comprises a basic solubilizer for at least the sealing layer.

8. A packaging material as claimed in claim 1, wherein:
   said water-insoluble sealing layer and said soluble layer are comprised of like thermoplastic material which is normally water-insoluble; and,
   said soluble layer contains a solubilizer for itself and for said sealing layer.

9. A packaging material as claimed in claim 1, wherein said sealing layer is substantially comprised of a water-insoluble and basic-medium-soluble thermoplastic homopolymeric acid.

10. A packaging material as claimed in claim 1, wherein said sealing layer is substantially comprised of a basic-medium-soluble copolymeric acid.

11. A packaging material as claimed in claim 1, wherein said sealing layer is substantially comprised of a copolymer of maleic acid anhydride.

12. A packaging material as claimed in claim 1, wherein said soluble layer is substantially comprised of a thermoplastic, soluble cellulose derivative.

13. A packaging material as claimed in claim 1, wherein at least said sealing layer is substantially comprised of a water-insoluble and basic-medium-soluble thermoplastic copolymeric acid.

14. A packaging material as claimed in claim 1, wherein at least said sealing layer is substantially comprised of a basic-medium-soluble terpolymeric acid.

15. A packaging material as claimed in claim 1, wherein at least said sealing layer is substantially comprised of a terpolymer of maleic acid anhydride.

16. A packaging material as claimed in claim 1, wherein:
   said soluble layer has a thickness of 5 to 500 m; and
   said sealing layer has a thickness of 1 to 10 m.

17. A packaging material as claimed in claim 16, wherein said sealing layer has a thickness of 2 to 3 m.

18. A packaging material as claimed in claim 1, comprising at least three layers, two of said layers being comprised of soluble material and constructed in the manner of an air cushion composite foil with incorporated air cushions.

19. A packaging material as claimed in claim 1, wherein said material is a web-shaped tube.

20. A packaging material as claimed in claim 1, wherein said material is in the form of a bag.

21. A packaging material as claimed in claim 1, further comprising two individual composite foils, each foil having a insoluble sealing layer connected to a soluble layer, said water-soluble layers facing one another.

22. A packaging material as claimed in claim 21, wherein said soluble layers rest loosely on one another.

23. A packaging material as claimed in claim 21, further comprising a porous, soluble intermediate layer interconnecting said soluble layers.

24. A process for the continuous production of a multi-layered, non-porous packaging material having a substantially water-insoluble waterproof layer on one side and a soluble layer from the other side, said the soluble layer containing a solubilizer for said water-insoluble layer, said process comprising:

extruding said layers from thermoplastic material;
interconnecting said layers to each other; and,
said water-insoluble layer being soluble in a non-neutral medium, and said soluble layer comprising a solublizer in an amount sufficient for solubilizing a corresponding portion of said water-insoluble layer.

25. A process as claimed in claim 24, wherein said soluble layer is water soluble.

26. A process as claimed in claim 24, wherein said soluble layer is water-insoluble and soluble in a non-neutral medium.

27. A process as claimed in claim 24, wherein said step of interconnecting said layers comprises jointly extruding the thermoplastic material through a co-extrusion nozzle and connecting the layers together.

28. A process as claimed in claim 24, further comprising thermally, continuously cutting said interconnected layers into blanks by cutting welding.

29. A process as claimed in claim 28, wherein:
said cutting comprises successively cutting said blanks of packaging material with tools which move together with the interconnected layers during said extrusion; and
further comprising stacking each blank on a preceding blank.

30. A process as claimed in claim 28, wherein said cutting and stacking of said individual blanks occurs on a continuous conveying means, said conveying means be comprised of a roller carrying means for the cutting welding, said roller carrying means being dimensioned to correspond to an integral multiple of a length between individual blanks.

31. A process as claimed in claim 28, further comprising supplying waste material obtained during cutting and containing solubilizing material is supplied to an extruder for producing said soluble layer.

32. A process as claimed in claim 24, further comprising coating a free top surface of said packaging material with textile fibres after cutting.

* * * * *

UNITED STATES PATENT AND TRADEMARK OFFICE
CERTIFICATE OF CORRECTION

PATENT NO. : 4,551,369
DATED : November 5, 1985
INVENTOR(S) : Roland K. Belz

It is certified that error appears in the above-identified patent and that said Letters Patent is hereby corrected as shown below:

Column 1, line 46 before "when" insert --than--.

Column 7, line 34 after "dissolving" insert --of--.

Signed and Sealed this

Twenty-ninth Day of July 1986

[SEAL]

Attest:

DONALD J. QUIGG

*Attesting Officer*  Commissioner of Patents and Trademarks